United States Patent
Redford et al.

(10) Patent No.: US 11,085,319 B2
(45) Date of Patent: Aug. 10, 2021

(54) GAS TURBINE ENGINE TIP CLEARANCE CONTROL SYSTEM

(71) Applicant: PRATT & WHITNEY CANADA CORP., Longueuil (CA)

(72) Inventors: Timothy Redford, Campbellville (CA); David Menheere, Norval (CA); Richard Kostka, Bolton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 115 days.

(21) Appl. No.: 16/448,508

(22) Filed: Jun. 21, 2019

(65) Prior Publication Data
US 2020/0400034 A1 Dec. 24, 2020

(51) Int. Cl.
*F01D 11/22* (2006.01)
*F02C 3/08* (2006.01)

(52) U.S. Cl.
CPC ............. *F01D 11/22* (2013.01); *F02C 3/08* (2013.01); *F05D 2220/32* (2013.01); *F05D 2240/52* (2013.01)

(58) Field of Classification Search
CPC .... F01D 11/14–18; F01D 11/20; F01D 11/22; F01D 11/24; F16C 31/04; F16C 31/06; F16C 31/58–64; F16C 35/077; F02C 3/08; F16H 25/20
See application file for complete search history.

(56) References Cited

U.S. PATENT DOCUMENTS

| | | | | |
|---|---|---|---|---|
| 1,823,310 A * | 9/1931 | Allen | ................ | F01D 11/02 415/48 |
| 2,386,587 A * | 10/1945 | Briner | ................ | B64C 11/36 416/165 |
| 2,432,359 A * | 12/1947 | Streid | ................ | F02C 3/08 60/39.08 |
| 2,762,559 A * | 9/1956 | Faught | ................ | F01D 11/22 415/17 |
| 5,263,816 A | 11/1993 | Weimer et al. | | |
| 6,234,749 B1 * | 5/2001 | Hasegawa | ............ | F01D 11/122 415/122.1 |
| 6,273,671 B1 * | 8/2001 | Ress, Jr. | ................ | F01D 5/043 415/1 |
| 7,341,426 B2 * | 3/2008 | Schwarz | ............... | F01D 11/122 415/127 |
| 7,824,151 B2 * | 11/2010 | Schwarz | ................ | F01D 11/22 415/131 |

(Continued)

FOREIGN PATENT DOCUMENTS

FR 2692331 A1 * 12/1993 ............ F16H 53/04

*Primary Examiner* — Igor Kershteyn
*Assistant Examiner* — Topaz L. Elliott
(74) *Attorney, Agent, or Firm* — Norton Rose Fulbright Canada LLP

(57) ABSTRACT

A system for controlling gas turbine engine rotor blades tip clearance is described. A rotor is mounted to an engine shaft, supported by a thrust bearing, for rotation within a gas path shroud circumscribing blades of the rotor, the gas path shroud having a non-cylindrical shape in the vicinity of the rotor blades. A rotary actuator is associated with the thrust bearing and configured for axial translation of the thrust bearing, to thereby axially translate the engine shaft and the rotor blades relative to the gas path shroud. This translation is configured to vary the blade tip clearance of the rotor.

20 Claims, 9 Drawing Sheets

(56) References Cited

U.S. PATENT DOCUMENTS

| | | |
|---|---|---|
| 7,909,566 B1 | 3/2011 | Brostmeyer |
| 8,011,883 B2 * | 9/2011 | Schwarz ............... F01D 11/24 415/173.2 |
| 8,177,476 B2 | 5/2012 | Andrew et al. |
| 8,449,243 B2 | 5/2013 | Fiala et al. |
| 9,593,589 B2 | 3/2017 | Trivedi et al. |
| 2016/0160875 A1 | 6/2016 | Schwarz |
| 2016/0215647 A1 | 7/2016 | Smith |

* cited by examiner

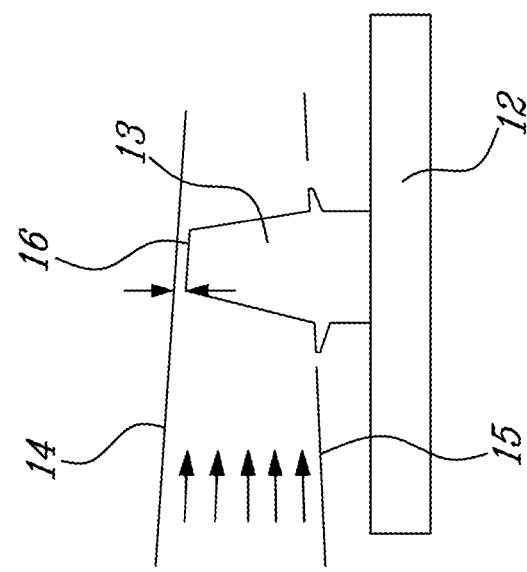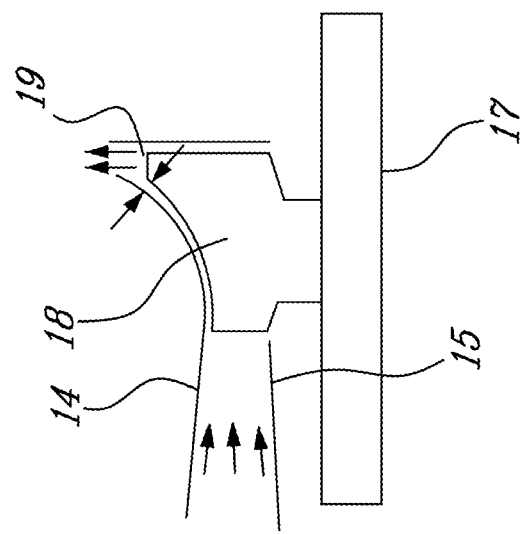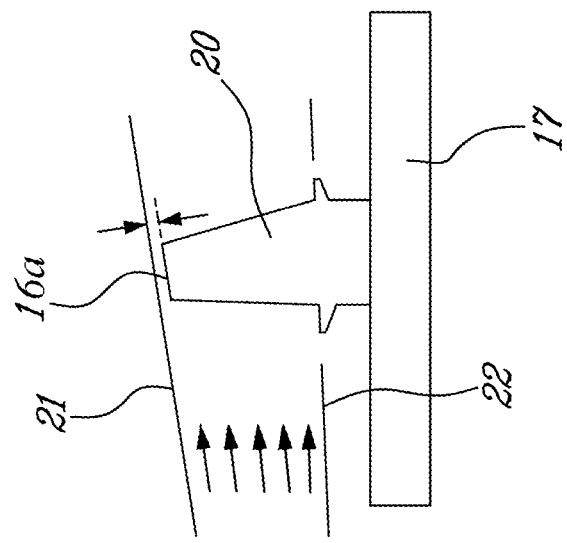

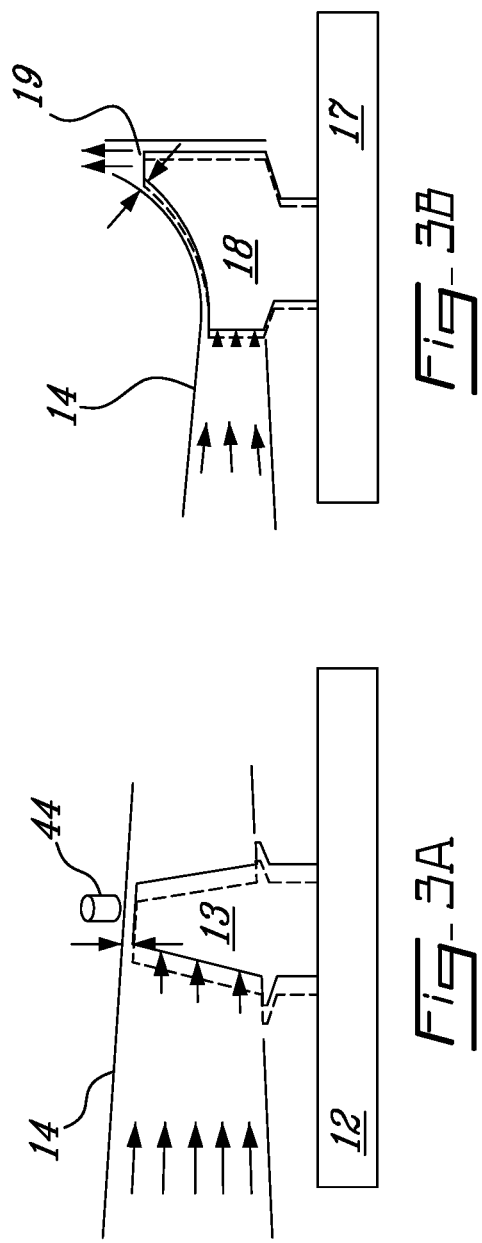
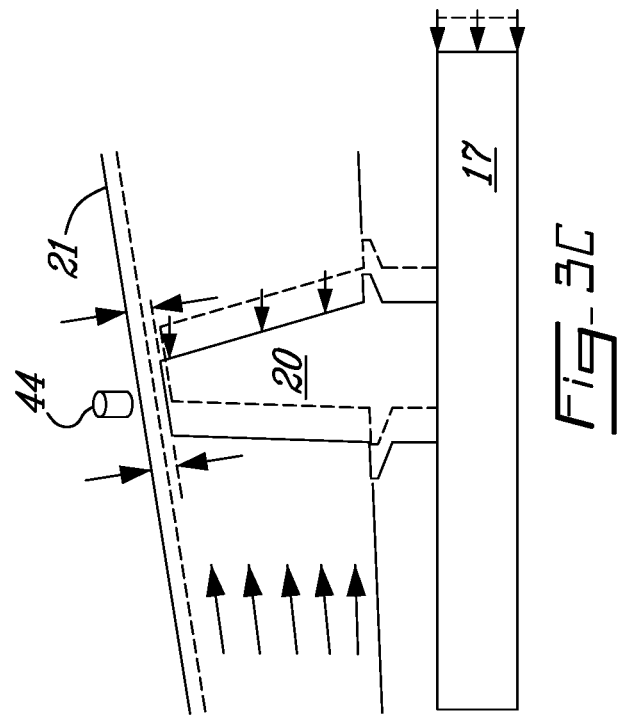

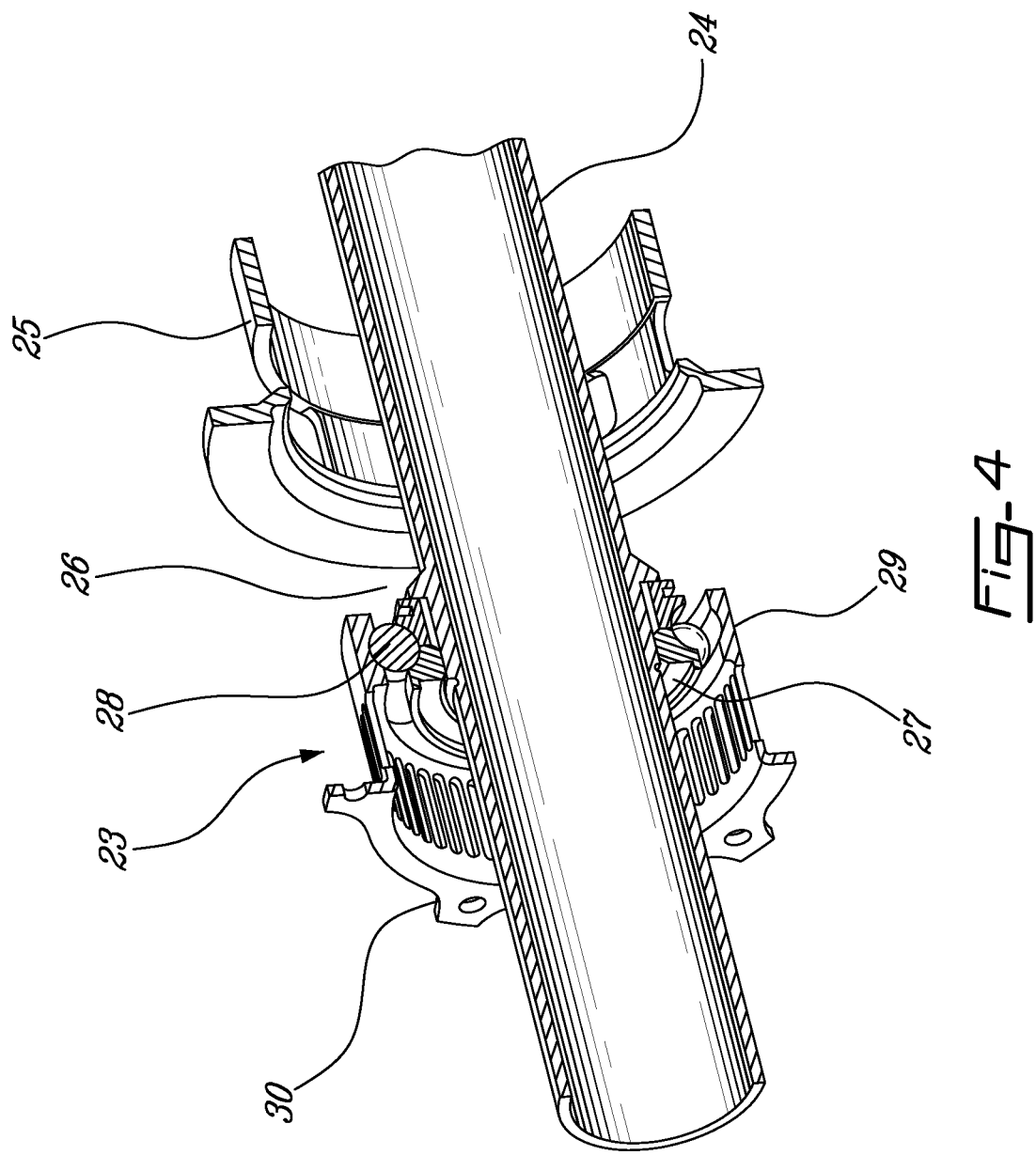

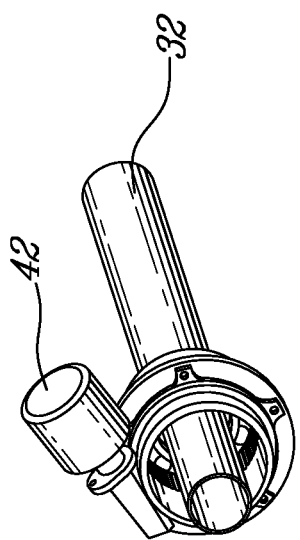
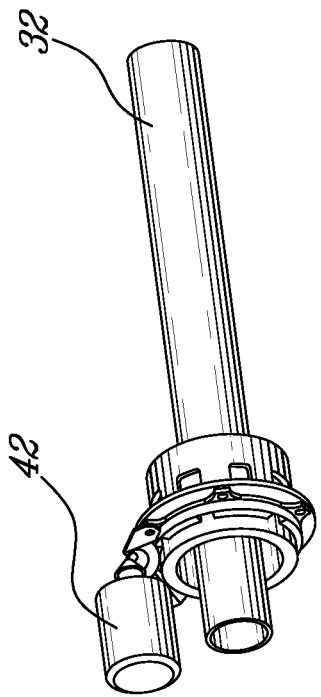
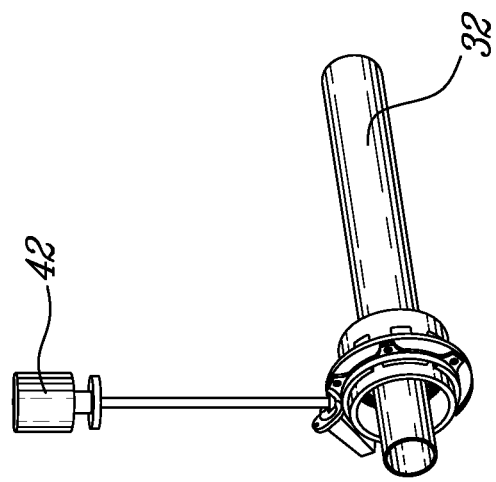

GAS TURBINE ENGINE TIP CLEARANCE CONTROL SYSTEM

TECHNICAL FIELD

The disclosure relates generally to gas turbine engine rotors, and more particularly to a system and method for controlling rotor tip clearance.

BACKGROUND

Gas turbine engine design aims for the components to be efficient at their design conditions (typically at take-off and cruise conditions for aircraft engines) and also at off-design conditions (idling and low altitude). Rotor blade tip clearance with respect to the outer wall of the gas path is one aspect that can affect efficiency and/or performance of rotating components all operating conditions. For example, a turbine can be designed to have a target blade tip clearance at a design point, but as the engine begins to operate outside the design point the tip clearance can grow by as much as 200%.

To avoid physical contact between the blade tip and the surrounding shroud or case, and due to reasonable manufacturing tolerances, some minimal clearance is provided in all conditions. However tip clearance of any degree represents an engine efficiency penalty due to gas leakage past the blade tip and ideally leakage would be minimized under all conditions if possible. It is accordingly desirable to be able to control the blade tip clearance for rotating components in gas turbine engines, such as for axial and centrifugal compressor rotors and turbine rotors.

While attempts have been made to control and/or manage rotor tip clearances for such components in a manner that will limits overall engine performance and/or efficiency penalties, improvements remain desirable.

SUMMARY

There is accordingly provided a system for controlling gas turbine engine rotor blades tip clearance, the system comprising: a rotor mounted to an engine shaft for rotation within a gas path shroud circumscribing blades of the rotor, the gas path shroud having a non-cylindrical shape in the vicinity of the rotor blades; a thrust bearing supporting the engine shaft; and a rotary actuator associated with the thrust bearing and configured for axial translation of the thrust bearing to thereby axially translate the engine shaft and the rotor blades relative to the gas path shroud, said translation configured to vary a blade tip clearance of the rotor.

There is also provided a method of controlling rotor blade tip clearance in a gas turbine engine, the rotor blade tip clearance defined as a radial gap between blade tips of a rotor and an outer gas path wall, the rotor mounted to a shaft for rotation about a shaft axis, the method comprising: supporting the shaft using a thrust bearing disposed within a bearing housing, the shaft axis being non-parallel to the outer gas path wall; and axially translating the thrust bearing and the shaft using a rotary actuator to drive a rotary-to-linear motion mechanism.

There is further provided a system for controlling tip clearance between tips of rotor blades and a surrounding outer gas path wall in a gas turbine engine, the rotor blades mounted to an engine shaft for rotation about a shaft axis, the system comprising: a thrust bearing disposed in a bearing housing, the thrust bearing supporting the engine shaft and located at a fixed axial position thereon; and a rotary actuator driving a rotary-to-linear motion mechanism, the rotary-to-linear motion mechanism axially translating the thrust bearing relative to the bearing housing and thereby axially translating the engine shaft and the rotor blades mounted thereto within the gas turbine engine; wherein the outer gas path wall is non-parallel to the shaft axis, and the tip clearance changes due to the axial translation of the rotor blades and the engine shaft by the rotary-to-linear motion mechanism.

In an alternate aspect, there is provided a method of controlling rotor blade tip clearance in a gas turbine engine, the engine including a rotor blade disposed on a shaft supported on a thrust bearing in a bearing housing for rotation about a shaft axis, the rotor blade having a blade tip surrounded by an outer gas path wall wherein the outer gas path wall is non-parallel to the shaft axis, the rotor blade tip clearance being defined as a distance between the blade tip and outer gas path wall, the method comprising: axially translating the rotor blade, shaft and bearing, relative to the bearing housing, using a rotary actuator to drive a rotary-to-linear motion mechanism.

In a further alternate aspect, there is provided a device for controlling rotor blade tip clearance in a gas turbine engine, the device including a rotary actuator driving a rotary-to-linear motion mechanism for axially translating the rotor blade, shaft and bearing relative to the bearing housing.

There is accordingly described herein a system and method for controlling rotor tip clearance, with a worm gear used to axially translate by axially moving the thrust bearing and rotor shaft directly, and therefore the rotor blades mounted on the gas turbine spool.

Further details of these and other aspects of the subject matter of this application will be apparent from the detailed description included below and the drawings.

BRIEF DESCRIPTION OF THE DRAWINGS

FIGS. 2A to 2C are schematic axial sectional view showing an axial compressor blade, a centrifugal compressor impeller blade and a turbine blade, respectively, showing the gas path shape and blade tip clearances associated with each blade type.

FIGS. 3A to 3C are schematic axial sectional views showing the effect of axially translating the shaft-blade-bearing assembly relative to the outer gas path wall associated with changes in blade tip clearances for each of the blade types shown in FIGS. 2A to 2C, respectively.

FIG. 4 is an exemplary exploded perspective view of a thrust bearing, shaft and bearing housing assembly with no axial translation capability, to contrast with the assembly described below in association with FIGS. 5-11.

FIG. 7 also shows the exploded view of the worm drive gear (tangential to the worm wheel of the squirrel cage) with an electric or hydraulic drive motor.

FIG. 9 shows the assembled components of FIGS. 7-8 in perspective view.

FIG. 10 shows an alternative assembly with an extension drive shaft between the worm gear and the drive motor to locate the drive motor remote from the shaft.

FIG. 11 shows a further alternative assembly with the drive motor axis mounted offset and parallel to the engine shaft axis.

DETAILED DESCRIPTION

As will be seen a system and method for controlling rotor tip clearance (i.e. a tip clearance gap) in a gas turbine engine is herein provided, with, in at least a particular embodiment, a worm gear and barrel cam mechanism used to axially translate the thrust bearing and rotor shaft, resulting in axial movement of the rotor blades mounted on the gas turbine spool to precisely adjust tip clearance.

Examples of rotating components in gas turbine engines with blade tip clearances requiring controls may include axial compressors, centrifugal compressors, and turbines. Although a low pressure axial compressor is not exposed to high heat and does not experience significant changes in the tip clearance, the impeller of a high pressure centrifugal compressor experiences changes in the tip clearance at the exducer as the impeller speed and centrifugal load changes, and due to thermal expansion resulting from the heat generated by the compression of air.

An unshrouded turbine, disposed in the hot combustion gas path, typically experiences the most significant tip clearance changes due to thermal expansion of the outer gas path wall. When the turbine blade tip clearance increases, the efficiency of the engine decreases as gas leakage around the turbine blade tips increases. Blade tip clearance can increase through thermal expansion or deterioration such as corrosion, damage, and metal fatigue. Gas leakage at the blade tip has a direct impact on engine performance and the fuel efficiency. For example high pressure turbine blade tip clearance can be approximately 0.010" at the design point and a minimum high pressure turbine tip clearance can be 0.008" throughout the rest of the operating envelope. A turbine blade tip clearance increase of +0.010" can be equivalent to approximately 1.2% efficiency decrease for the high pressure turbine. In off-design conditions (idling, low altitude etc.) the turbine tip clearance can increase by as much as +0.020", resulting in efficiency losses of 2-3%.

Figure 1:
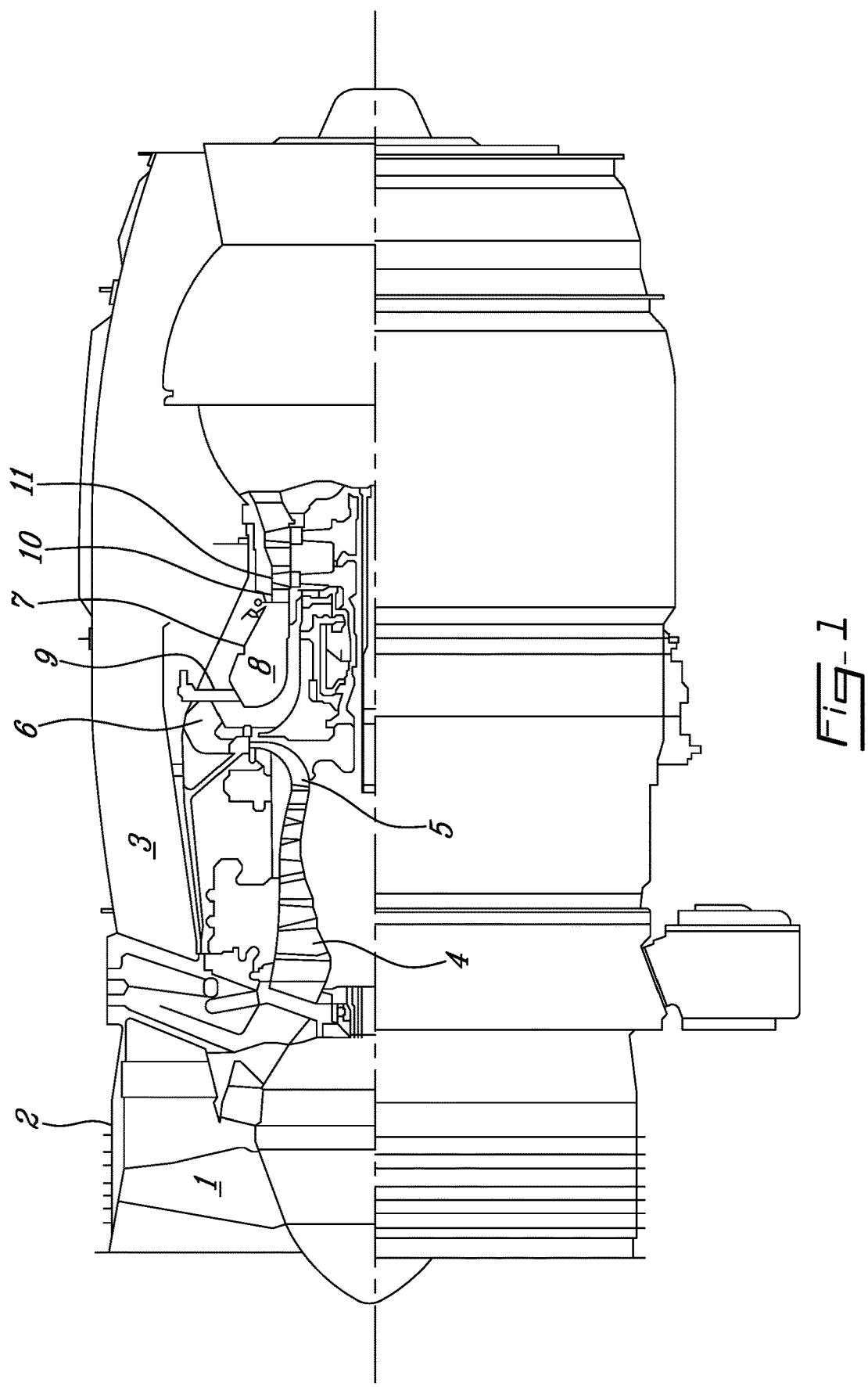
FIG. 1 shows an axial cross-section view of an example turbo-fan gas turbine engine.

Referring now to FIG. 1 shows an axial cross-section through an example turbo-fan gas turbine engine. Air intake into the engine passes over fan blades 1 in a fan case 2 and is then split into an outer annular flow through the bypass duct 3 and an inner flow through the low-pressure axial compressor 4 and high-pressure centrifugal compressor 5. Compressed air exits the compressor 5 through a diffuser 6 and is contained within a plenum 7 that surrounds the combustor 8. Fuel is supplied to the combustor 8 through fuel tubes 9 and fuel is mixed with air from the plenum 7 when sprayed through nozzles into the combustor 8 as a fuel air mixture that is ignited. A portion of the compressed air within the plenum 7 is admitted into the combustor 8 through orifices in the side walls to create a cooling air curtain along the combustor walls or is used for cooling to eventually mix with the hot gases from the combustor and pass over the nozzle guide vane 10 and turbines 11 before exiting the tail of the engine as exhaust.

FIG. 2A illustrates a schematic axial sectional view showing an engine spool shaft 12, which in this embodiment is a low pressure spool shaft, on which an axial compressor blade 13 is mounted with gas flow from left to right contained between the compressor section outer gas path wall 14 and inner gas path wall 15. The gas path outer wall 14 may also be referred to herein as the gas path shroud. The arrows between the outer gas path wall (gas path shroud) 14 and the blade tip 16 indicate the blade tip clearance. FIGS. 2B and 2C show a high pressure spool shaft 17 on which a high pressure centrifugal impeller with a compressor blade 18 is mounted between the outer gas path wall 14 and inner gas path wall 15 of the compressor section. At the exducer 19, arrows between the centrifugal compressor impeller blade 18 and the outer gas path wall 14 indicate the blade tip clearance. FIG. 2C illustrates a schematic axial sectional view showing the high pressure spool shaft 17 with a high pressure turbine blade 20 between the turbine section or hot outer gas path wall 21 and inner gas path wall 22. The arrows between the outer gas path wall 21 and the blade tip 16a indicate the blade tip clearance.

It is to be understood that while these embodiments are depicted, alternate embodiments remain possible. For example, with respect to the compressor, the high and/or low pressure engine spool may be axially translated, as described herein, in order to vary the blade tip clearance of rotor blades mounted to these engine spools. Similarly, with respect to the turbine section, the high and/or pressure engine spools may be axially translated, as described herein, in order to vary the blade tip clearance of rotor blades mounted to these engine spools.

FIGS. 3A, 3B and 3C show the effect on blade tip clearance when the shafts 12, 17 and blades 13, 18, 20 are axially translated. In FIG. 3A the shaft 12 and axial compressor blade 13 are moved to the right. Since the outer gas path wall 14 is sloping downwardly (i.e. radially inwardly or contracting) the axial translation in an aft direction reduces the blade tip clearance indicated with arrows. However as shown in FIG. 3B due to the radially outward arcuate shape of the outer gas path wall 14 adjacent to the high pressure centrifugal compressor blade 18, the blade tip clearance at the exducer 19 increases with aftward axial translation or left to right as drawn.

It is to be understood that the outer gas path wall may be either radially increasing or radially decreasing, both for the compressor section and the turbine section.

FIG. 3C shows the "hot" section downstream from the combustor 8 (FIG. 1) where thermal expansion of the turbine section outer gas path wall 21 (which may also be referred to herein as the gas path shroud) increases the blade tip clearance as indicated with a dashed line (solid line for hot position and dashed line for cold position). Axial translation of the high pressure spool shaft 17 and turbine blade 20 to the left will reduce blade tip clearance due to radial slope of the outer gas path wall 21. In this embodiment, the outer gas path wall/shroud 21 slopes radially outwardly, relative to the direction of airflow. However, it is to be understood that in alternate embodiments, the outer gas path wall/shroud 21 may alternately slope radially inwardly. FIG. 3C shows in a schematic manner that blade tip clearance of a high pressure turbine blade 20 is a combination of radial thermal expansion of the outer gas path wall 21, radial thermal expansion of the turbine blade 20, and radial lengthening of the turbine blade 20 under stress caused by centrifugal forces during high speed rotation.

FIG. 4 shows an example exploded view of a thrust bearing 23, shaft 24 and bearing housing 25 assembly with no axial translation capability which is compared below to the assemblies having axial translation capability shown in FIGS. 5-11.

In FIG. 4, the thrust bearing 23 engages a flange 26 on the shaft 24. Axial force is transferred from the shaft 24 to the thrust flange 26 and then to the inner race 27 of the thrust bearing 23. Spherical ball bearings 28 are used in the example thrust bearing 23 since they are capable of transferring axial thrust force to the outer race 29 as well as supporting the shaft 24 against radial forces during rotation. The outer race 29 is axially extended and terminates in a bolt flange 30. The outer race 29 has elongate perforations and accordingly is sometimes referred to as a "squirrel cage". The bolt flange 30 is secured to the stationary bearing housing 25 with bolts (not shown). Accordingly the shaft 24 and inner race 27 can rotate freely. Axial thrust is transferred between the shaft 24 and the stationary bearing housing 25, via the thrust flange 26, inner race 27, ball bearings 28, and outer race 29 with bolt flange 30.

Figure 5:
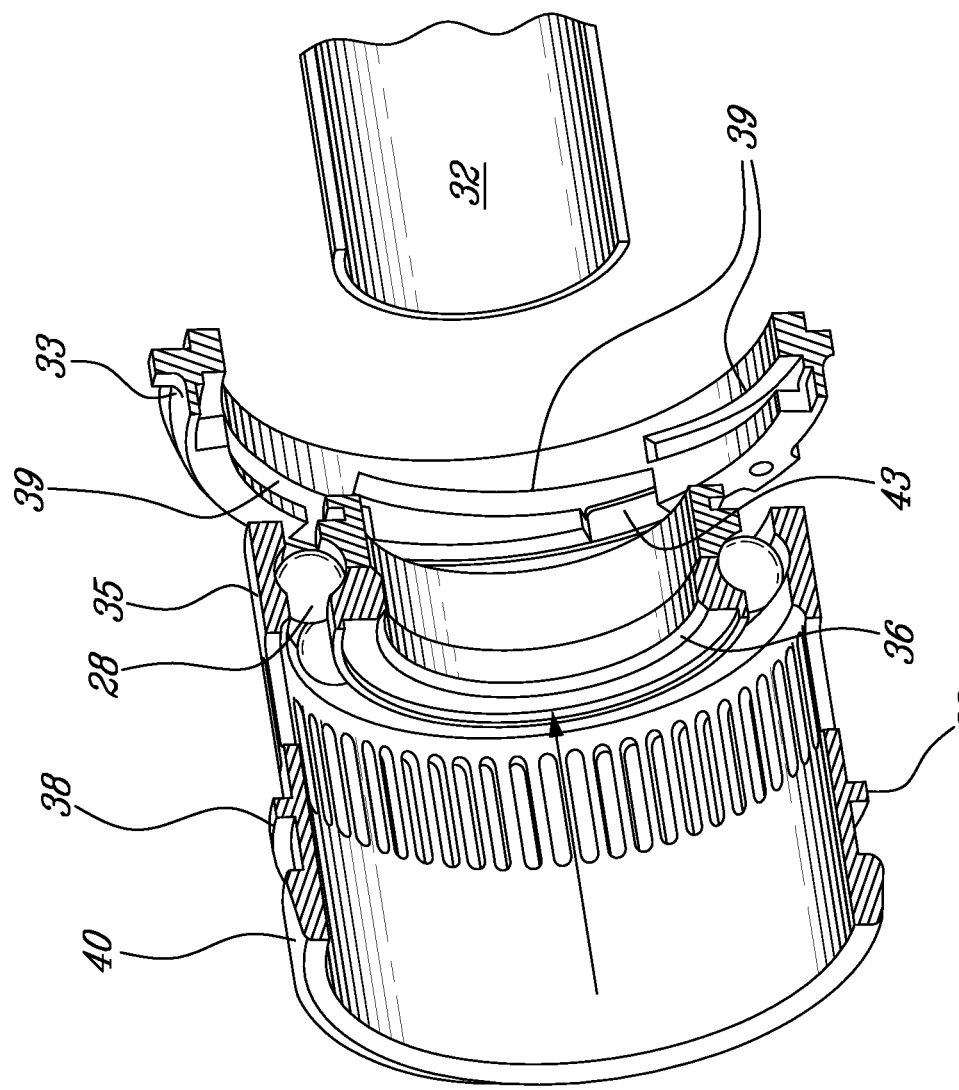
FIG. 5 is an axial sectional, exploded view of a thrust bearing, shaft and bearing housing assembly, in accordance with the present description, with axial translation capability provided by the rotation of a barrel cam mechanism.

The present description describes the addition of an axial translation capability to a thrust bearing arrangement as shown in FIG. 5. The axial translation capability enables the control of blade tip clearances as described above in association with FIGS. 3A-3C. As seen in FIGS. 3A and 3C proximity sensors 44 in communication with a control system can be used for measuring and controlling the changes in rotor blade tip clearance that result from axial translation.

Figure 6:
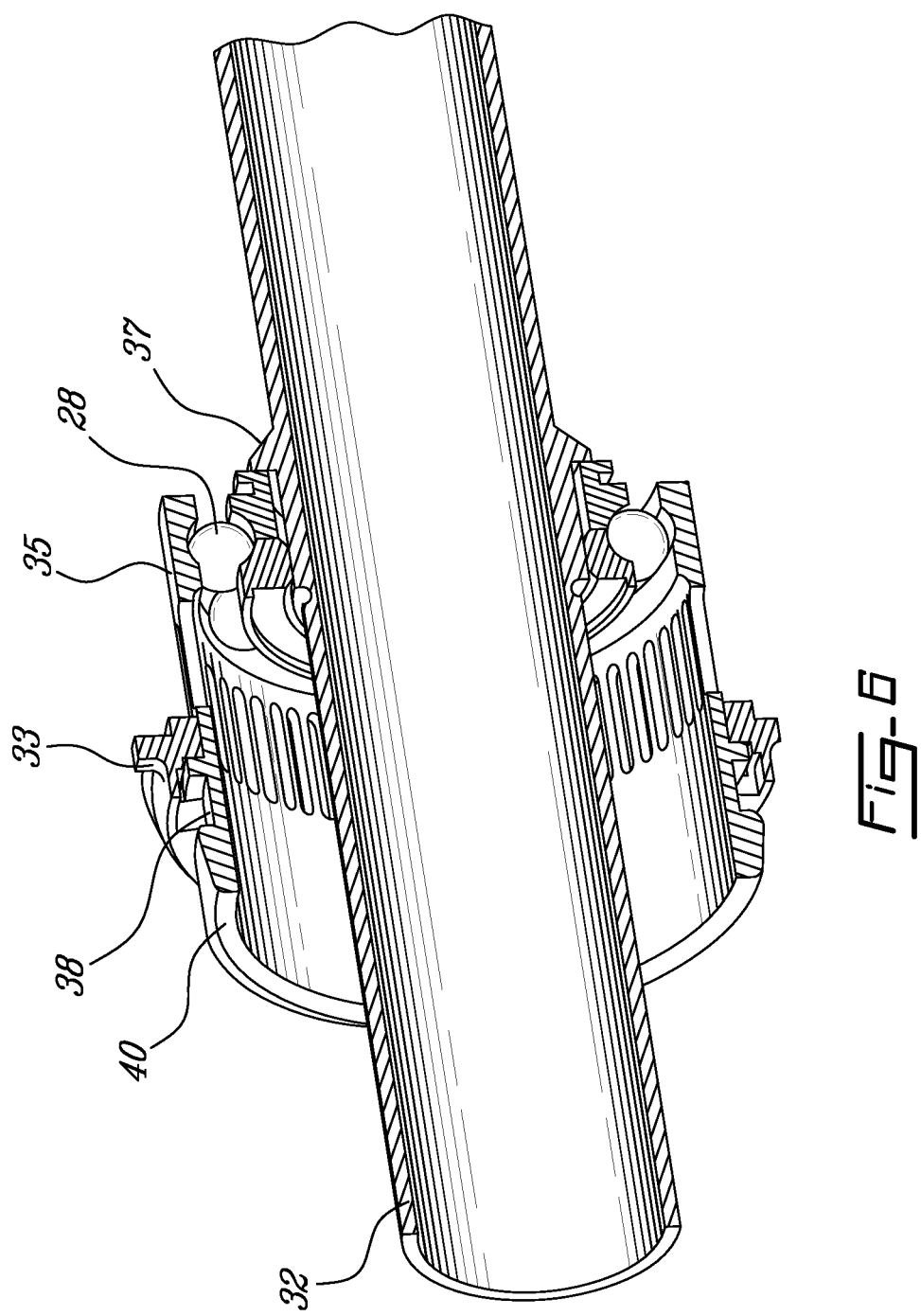
FIG. 6 is an axial sectional view, showing the components of FIG. 5 in unexploded, assembled view.
Figure 7:
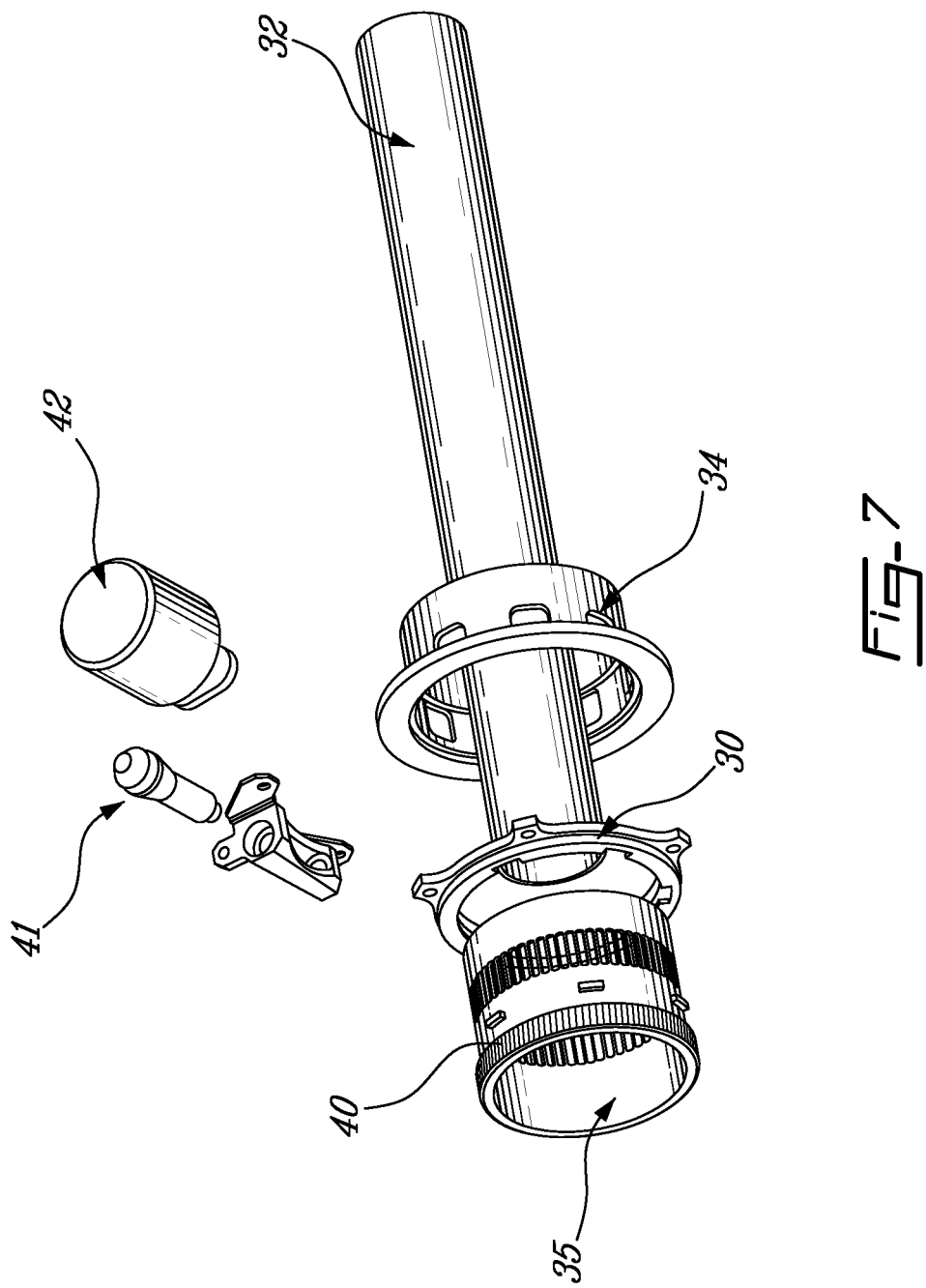
FIG. 7 shows an exploded perspective view of the barrel cam mechanism that produces axial movement including in axial progression the bearing outer race (squirrel cage) of FIG. 5, with worm wheel on a left end, the stationary bearing housing flange, shaft and bearing housing.
Figure 8:
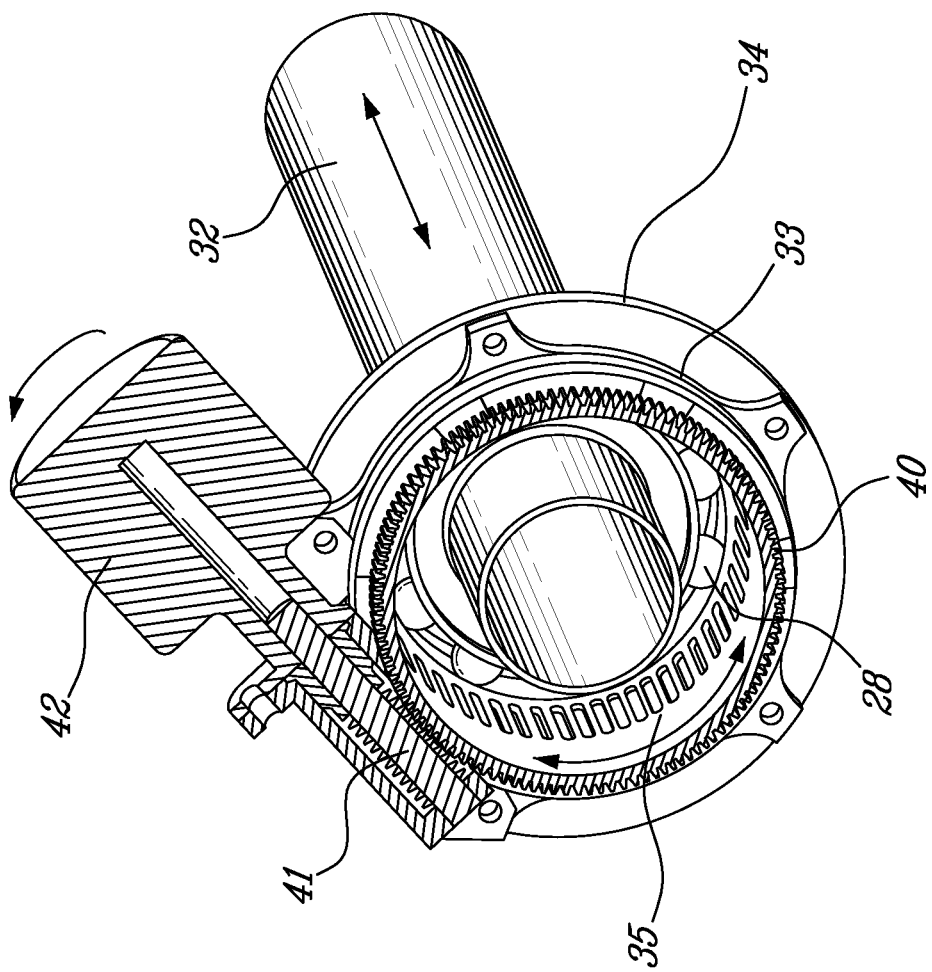
FIG. 8 shows the components of FIG. 5 in unexploded or assembled radial sectional view.

In accordance with the present description, FIGS. 5-8 show views of a thrust bearing 31, shaft 32 and bolt flange 33 of a bearing housing 34 (see FIG. 7) that provides axial translation capability when assembled. Rotation of the outer race 35 (squirrel cage) of the thrust bearing 31 results in axial translation of the shaft 32 as follows. The inner race 36 engages a thrust flange 37 (see FIG. 6) on the shaft 32 to transfer axial force between the shaft 32 and the outer race 35 of the thrust bearing 31. Referring to FIG. 5, the outer race 35 has external radially projecting cam follower tabs 38 that engage with internal helical cam slots 39 or grooves in the stationary bolt flange 33 secured to the stationary bearing housing 34 (FIGS. 7-8). With reference to FIGS. 7-8, the outer race 35 includes an external worm wheel 40 with gear teeth that engage a worm gear 41 driven by a motor 42.

FIGS. 5-6 do not show the motor 42 and worm gear 41 to more clearly show the outer race 35 with the external worm wheel 40 mechanism. The bolt flange 33 axially slides over the outer race 35. The cam follower tabs 38 are received axially into the axial tab insertion slots 43 and the cam follower tabs 38 are engaged into the helical cam slots 39 as shown in the non-exploded assembly of FIG. 6.

Referring to FIG. 5, it will be apparent that since the bolt flange 33 remains stationary, rotation of the outer race 35 will result in cam follower tabs 38 sliding within the helical cam slots 39. As the cam follower tabs 38 move in the helical cam slots 39, an axial reaction force is applied to the outer race 35 by the stationary bolt flange 33. Since the outer race 35, ball bearings 28 and inner race 36 are engaged together, the axial force is exerted on the thrust flange 37 of the shaft 32. Therefore the rotation of the outer race 35 driven by the worm wheel 40 will result in axial translation of the shaft 32, and thrust bearing 31 relative to the stationary bolt flange 33 and bearing housing 34 (FIG. 7-8). The cam slots 39 in the bolt flange 33 comprise a barrel cam mechanism. The cam slots 39 can be helical with a constant pitch or if desired a variable pitch can be provided.

Therefore the present description provides a method of controlling rotor blade tip clearance in a gas turbine engine.

In all cases the outer gas path wall 14, 21 is non-parallel to the engine shaft axis. If the outer gas path wall 14, 21 and engine shaft axis are parallel, the axial translation of the shaft will not affect the blade tip clearance, however the gas path is generally arcuate or sloped radially in most cases.

Using a rotary actuator (motor 42, worm gear 41) to drive a rotary-to-linear motion mechanism (worm wheel 40, barrel cam mechanism comprising helical cam slots 39 and cam follower tabs 38) the rotor blades 13, 18, 20, shaft 12, 17, 32 and thrust bearing 31, are axially translated relative to the stationary bearing housing 34.

In many gas turbine engines, a low pressure shaft has more than one rotor blade mounted on the shaft to form a low pressure spool and a high pressure spool. Due to the heat in the turbine section of the engine, locating the rotary actuator and rotary-to-linear motion mechanism in the cooler compressor section is advisable. In the present description, a spool will be described as a shaft that includes a master blade and a slave blade axially spaced apart. In general, one of the sets of blades will be of primary importance for controlling blade tip clearance, such as a turbine blade compared to a compressor blade. The method described herein includes controlling the master blade tip clearance by axially translating the shaft. The slave blade merely follows the motion of the shaft as a consequence.

For example the master blade can be one of the high pressure turbine blade and the low pressure turbine blade. In the case of a high pressure turbine blade the rotor blade tip clearance can be controlled using axial translation relative to the outer gas path wall without use of air cooling of the outer hot gas path wall. The rotor tip clearance can controlled using a proximity sensor or an empirically generated schedule of rotor tip clearance versus axial displacement for the rotor tip.

In other situations, such as controlling compressor surge conditions, the high pressure compressor impeller may be of primary concern. Accordingly in controlling surge, the master blade can be the high pressure centrifugal compressor blade adjacent the exducer. The rotor blade tip clearance can be controlled using axial translation of the compressor impeller relative to an exducer wall without use of air cooling of the impeller. Increasing the surge margin of a compressor can result from axially translating the master blade (impeller) to control rotational acceleration of the high pressure centrifugal compressor by regulating air flow through the rotor blade tip clearance.

In the case of a low pressure spool, the slave blade comprises a low pressure axial compressor blade, and an increase in the rotor blade tip clearance of the master blade (low pressure turbine) results in a decrease in the rotor blade tip clearance of the slave blade (low pressure compressor blade). As a corollary, a decrease in the rotor blade tip clearance of the master blade (low pressure turbine) results in an increase in the rotor blade tip clearance of the slave blade (low pressure compressor blade).

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A system for controlling gas turbine engine rotor blades tip clearance, the system comprising:
   a rotor mounted to an engine shaft for rotation within a gas path shroud circumscribing blades of the rotor, the gas path shroud having a non-cylindrical shape in a vicinity of the rotor blades;
   a thrust bearing supporting the engine shaft;
   a bearing housing extending around the engine shaft, the thrust bearing located inside the bearing housing;
   a rotary actuator associated with the thrust bearing and configured for axial translation of the thrust bearing relative to the bearing housing to thereby axially translate the engine shaft and the rotor blades relative to the gas path shroud, said translation configured to vary a blade tip clearance of the rotor.

2. The system according to claim 1, wherein the rotary actuator comprises a worm gear driving a worm wheel.

3. The system according to claim 2, further comprising a rotary-to-linear motion mechanism that is driven by the rotary actuator.

4. The system according to claim 3, wherein the rotary-to-linear motion mechanism comprises a barrel cam driven by the worm wheel.

5. The system according to claim 4, wherein the thrust bearing has an outer race, one of the bearing housing and the outer race of the bearing comprising the barrel cam, the barrel cam having a cam slot, and wherein the other one of the bearing housing and the outer race of the bearing includes a cam follower tab engaging the cam slot.

6. The system according to claim 5, wherein the cam slot comprises a helical slot having a constant pitch, such that a constant relationship exists between a change in axial position and a change in radial position of the cam follower tab relative to the cam slot.

7. The system according to claim 5, wherein the cam slot comprises a non-helical slot having a variable pitch axially along a length of the cam slot.

8. The system according to claim 5, wherein the cam slot includes an axial tab insertion slot.

9. The system according to claim 4, wherein an outer race of the thrust bearing comprises the barrel cam and has a cam slot, and the bearing housing includes a cam follower tab engaging the cam slot.

10. The system according to claim 1, further comprising proximity sensors in communication with a control system for measuring tip clearance.

11. A method of controlling rotor blade tip clearance in a gas turbine engine, the rotor blade tip clearance defined as a radial gap between blade tips of a rotor and an outer gas path wall, the rotor mounted to a shaft for rotation about a shaft axis, the method comprising:
   supporting the shaft using a thrust bearing disposed within a bearing housing, the shaft axis being non-parallel to the outer gas path wall; and
   axially translating the thrust bearing and the shaft relative to the bearing housing using a rotary actuator to drive a rotary-to-linear motion mechanism.

12. The method of claim 11, wherein the shaft includes a master blade and a slave blade mounted thereto in axially spaced apart relationship, the method including controlling a tip clearance of the master blade.

13. The method according to claim 12, wherein the master blade comprises one of a high pressure turbine blade and a low pressure turbine blade.

14. The method according to claim 13, further comprising controlling the rotor blade tip clearance by axially translating the rotor relative to the outer gas path wall without use of air cooling.

15. The method according to claim 11, wherein the rotor tip clearance is controlled using one of a proximity sensor and an empirically generated schedule of rotor tip clearance versus axial displacement of said blade tip.

16. The method according to claim 12, wherein the master blade comprises a high pressure centrifugal compressor exducer.

17. The method according to claim 16, wherein the rotor blade tip clearance is controlled using axial translation relative to an exducer wall without use of air cooling.

18. The method according to claim 16, comprising increasing a surge margin of a compressor by axially translating the master blade to control rotational acceleration of the high pressure centrifugal compressor by regulating air flow through the rotor blade tip clearance.

19. The method according to claim 16, wherein the slave blade comprises a low pressure axial compressor blade, and wherein an increase in the rotor blade tip clearance of the master blade results in a decrease in the rotor blade tip clearance of the slave blade, and wherein a decrease in the rotor blade tip clearance of the master blade results in an increase in the rotor blade tip clearance of the slave blade.

20. A system for controlling tip clearance between tips of rotor blades and a surrounding outer gas path wall in a gas turbine engine, the rotor blades mounted to an engine shaft for rotation about a shaft axis, the system comprising:
   a thrust bearing disposed in a bearing housing, the thrust bearing supporting the engine shaft and located at a fixed axial position thereon; and
   a rotary actuator driving a rotary-to-linear motion mechanism, the rotary-to-linear motion mechanism axially translating the thrust bearing relative to the bearing housing and thereby axially translating the engine shaft and the rotor blades mounted thereto within the gas turbine engine;
   wherein the outer gas path wall is non-parallel to the shaft axis, and the tip clearance changes due to the axial translation of the rotor blades and the engine shaft by the rotary-to-linear motion mechanism.

* * * * *